UNITED STATES PATENT OFFICE.

CHASE A. STEVENS, OF NEW YORK, N. Y., ASSIGNOR TO ISAAC D. CLIFT.

IMPROVEMENT IN PACKINGS FOR JOURNALS AND OTHER PARTS OF MACHINERY.

Specification forming part of Letters Patent No. 101,394, dated March 29, 1870; reissue No. 5,551, dated August 26, 1873; application filed January 22, 1873.

*To all whom it may concern:*

Be it known that CHASE A. STEVENS, of the city, county, and State of New York, did invent an Improvement in Packing Journals and other parts of Machinery, of which the following is a specification:

This invention relates to packing made from pure asbestus, amianthus, or other fibrous mineral.

In carrying out the invention, crude asbestus or other fibrous mineral is subjected to treatment with suitable acids, or by other means, so as to disintegrate and reduce it to a fibrous condition, after which it is subjected to the operation of picking by suitable machinery, similar to the operation of picking cotton and wool, and thereby reduced to a fine flexible and loose or flocky condition. In this state the asbestus or other fibrous mineral is suitable for packing the journal-boxes of car axles and bearings, or of heavy shafting, and wherever loose packing can be used.

The mineral fibers possess within themselves lubricating properties, but when additional lubrication is required the asbestus and other fibrous mineral is saturated with suitable oils, such, for example, as lard-oil, but much less in quantity is required than commonly used with cotton-waste packing.

The improved packing is a poor conductor of heat and electricity, and does not promote the generation of heat like cotton or other vegetable packing; it is, at the same time, a better absorbent of oils than either vegetable or animal fibers, and the oil is more thoroughly diffused and disseminated through the mass than is the case with such other packings, and it retains the oil in absorption without much evaporation or volatilization.

Where rope packing is required, the asbestus is combined with a central cord of twine or other material of sufficient tensile strength, and binding-threads of animal or vegetable fiber are wound round the mass and arranged so as to be concealed and protected to as great a degree as possible by the overlapping mineral fibers, which preserve the binding-threads from the destructive action of heat or friction.

The pure asbestus or other fibrous mineral, in its flocky condition, is combined with a textile medium, so as to form it into strands of sufficient tensile strength for the purpose required, the flocky fibers being secured with binding-threads.

The asbestus packing above described can be made by hand or by machinery, and of any desired thickness, and several strands thereof can be combined together.

The packing is applicable for pistons of steam-engines and pumps and other articles.

It is not desired to confine the invention to any particular shape of packing, as it can be made flat as well as round, or of other forms.

By combining the asbestus fiber with twine or other material of sufficient tensile strength, a rope-packing is produced which will bear handling, and endure any ordinary strain to which it may be subjected when applied to use.

I claim as the invention of the said CHASE A. STEVENS—

1. A packing, composed of asbestus combined with internal strengthening fibers and with an outer binding, substantially as set forth.

2. A packing of asbestus having an outer binding-thread arranged so as to be concealed, or partly concealed, and overlapped by the mineral fibers, as set forth.

In testimony whereof I have signed my name to this specification in the presence of two subscribing witnesses.

Witnesses: ISAAC D. CLIFT.

WM. A. STEEL,

HUBERT HOWSON.